| United States Patent [19] | [11] | 4,330,658 |
|---|---|---|
| Ikeguchi et al. | [45] | May 18, 1982 |

[54] CURABLE RESIN COMPOSITION

[75] Inventors: Nobuyuki Ikeguchi; Hidenori Kimbara, both of Tokyo, Japan

[73] Assignee: Mitsubishi Gas Chemical Company, Inc., Tokyo, Japan

[21] Appl. No.: 218,673

[22] Filed: Dec. 22, 1980

[30] Foreign Application Priority Data

Dec. 24, 1979 [JP] Japan .................................. 54-167871

[51] Int. Cl.³ ....................... C08G 18/28; C08G 18/77
[52] U.S. Cl. ...................................... 528/73; 525/436; 528/322; 528/324; 528/331; 528/350; 528/353
[58] Field of Search .................. 525/436; 528/322, 73, 528/324, 331, 350, 353

[56] References Cited

U.S. PATENT DOCUMENTS

| 3,448,079 | 6/1969 | Grigat et al. | 260/59 |
|---|---|---|---|
| 3,553,244 | 1/1971 | Grigat et al. | 260/453 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AR |
| 3,943,107 | 3/1976 | Seltzer et al. | 525/436 |
| 4,059,559 | 11/1977 | Burkhardt et al. | 260/448.2 E |
| 4,110,364 | 8/1978 | Gaku et al. | 528/172 |

FOREIGN PATENT DOCUMENTS 1060933 3/1967 United Kingdom .

*Primary Examiner*—Morton Foelak
*Attorney, Agent, or Firm*—Browdy and Neimark

[57] ABSTRACT

Curable resin compositions comprising a mixture and/or a preliminary reaction product of (a) at least one cyanate compound selected from the group consisting of polyfunctional cyanate esters, prepolymers of said cyanate esters, coprepolymers of said cyanate esters and an amine and mixtures thereof and (b) a polyamideimide resin and optionally (c) at least one maleimide compound selected from the group consisting of polyfunctional maleimides, prepolymers of said maleimides, coprepolymers of said maleimides and an amine and mixtures thereof are disclosed.

9 Claims, No Drawings

CURABLE RESIN COMPOSITION

BACKGROUND OF THE INVENTION

This invention relates to a curable resin composition comprising a mixture and/or a preliminary reaction product of (a) a polyfunctional cyanate ester, a prepolymer of the cyanate ester or a coprepolymer of the cyanate ester and an amine (sometimes hereinunder referred to as component (a)), and (b) polyamideimide resin (sometimes hereinunder referred to as component (b)) and also relates to a curable resin composition comprising a mixture and/or a preliminary reaction product of (a) a polyfunctional cyanate ester, a prepolymer of the cyanate ester or a coprepolymer of the cyanate ester and an amine, (b) a polyamideimide resin and (c) a polyfunctional maleimide, a prepolymer of the maleimide or a coprepolymer of the maleimide and an amine (sometimes hereinunder referred to as component (c)). Cured resin obtained by curing each of the resin compositions has excellent flex cracking-resistance, water resistance, heat-resistance and chemical resistance.

In the prior art, the coating obtained from a composition containing a polyfunctional cyanate ester and a polyfunctional maleimide has low flex cracking-resistance. The coating obtained from a polyamideimide resin has low water resistance and low chemical resistance.

SUMMARY OF THE INVENTION

The present inventors carried out research for obtaining a cured resin having excellent flex cracking-resistance and excellent adherence to the substrate. As a result it was found that when a curable resin composition comprising a mixture and/or a preliminary reaction product of (a) a polyfunctional cyanate ester, prepolymer of the cyanate ester or coprepolymer of the cyanate ester and an amine, and (b) a polyamideimide resin, or a curable resin composition comprising a mixture and/or a preliminary reaction product of above component (a), above component (b) and component (c) a polyfuncitional maleimide, prepolymer of the maleimide or coprepolymer of the maleimide and an amine is cured, a cured resin having the above mentioned desirable properties can be obtained. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula

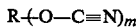

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

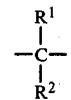

wherein $R^1$ and $R^2$ are the same or different and each represents a hydrogen atom or an alkyl group containing 1 to 4 carbon atoms,

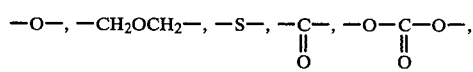

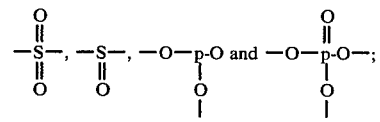

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated disphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 41112/1979 and Japanese Patent Publication (laid open) No. 63129/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'- diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl) phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

The polyamideimide is polymers having an amide bond part and an imide bond part in the molecule. The polymers are typically produced by (1) reacting trimellitic anhydride with aromatic diamine or aromatic diisocyanate, and (2) reacting pyromellitic anhydride, aromatic diamine and aromatic dicarboxylic acid or aromatic aminocarboxylic acid. Polyamideimide resins having a heterocyclic ring such as a hydantoin ring may also be used.

The ratio of component (a) and component (b) is not critical. The ratio by weight of component (a) to component (b) may be in the range of from 99:1 to 1:99, preferably from 95:5 to 35:65. For example, when it is necessary for a cured resin to have heat resistance, more component (a) is used than component (b).

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

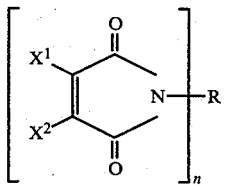

wherein R represents divalent to pentavalent aromatic or alicyclic organic group, each of $X^1$ and $X^2$ represents a hydrogen atom, halogen atom or alkyl group, and n represents integer of 2-5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above mentioned amines, melamine having s-triazine ring and polyamines obtained by reaction of aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above mentioned components (a) and (b) or components (a), (b) and (c) or by using the product of preliminary reaction of these components.

The curable composition of this invention comprises a mixture and/or a preliminary reaction product of (a) at least one cyanate compound selected from the group consisting of polyfunctional cyanate esters, prepolymers of the cyanates esters, coprepolymers of the cyanate esters and an amine and mixtures thereof and (b) a polyamideimide resin and optionally (c) at least one maleimide compound selected from the group consisting of polyfunctional maleimides, prepolymers of the maleimides, coprepolymers of the maleimides and an amine and mixtures thereof and/or (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof.

Other components (d) include polyimide resins; epoxy resins; (meth)acrylates, such as methacrylates, acrylates, acrylic alkenyl esters, methacrylic alkenyl esters, methacrylic epoxy esters, acrylic epoxy esters, its prepolymers; polyallyl compounds, such as diallyl phthalate, divinylbenzene, diallylbenzene, trialkenyl isocyanulates or its prepolymers; phenol resins; polyvinyl acetal resins, such as polyvinyl formal, polyvinyl acetal, or polyvinyl butyral; acrylic resins, silicone resins, or alkyd resins having OH group or COOH group; and liquid or elastic rubbers, such as polybutadiene, butadiene-acrylonitrile copolymer, polychloroprene, butadiene-styrene copolymer, polyisoprene or natural rubbers.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octolate, tin oleate, dibutyl tin maleate, manganese naphthenate, cobalt naphthenate, and acetyl aceton iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride; hexahydropyromellitic anhydride and hexahydrotrimellitic anhydride, azo compounds, such as azoisobutylonitrile, 2,2'-azobispropane, m,m'-azoxystyrene, hydrozones, and mixtures thereof.

In addition to the above mentioned calaysts, a curing agent for epoxy resin and a curing catalyst for epoxy resin may be used as a catalyst of this invention.

The amount of the catalyst employed may be less than 5% by weight of total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on the proportions of components constituting the composition and the nature of the components employed. In general, the composition of this invention may be cured by heating it at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a superpressure of 10–500 Kg/cm$^2$.

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in mechanical properties, such as impact resistance, chemical resistance, moisture resistance and the like. The composition of this invention has a variety of uses: as a coating material for rust prevention, flame resistance, flame retardance and the like; as electrical insulating varnish; as adhesive; in laminates to be used for furniture, building materials, sheathing materials, electrical insulating materials, and the like; and in a variety of moldings.

The present invention is further illustrated by the following non-limiting Examples and Comparative Examples. Percent and parts are by weight, unless otherwise specified.

EXAMPLE 1

Preliminary reaction of 800 grs. of polyamideimide (Aramidyl produced by Westinghouse) and 200 grs. of 2,2-bis(4-cyanatophenyl)propane was effected at 150° C. for 420 minutes. The preliminary reaction product was dissolved in N,N-dimethylformamide. 0.1 Gr. of zinc octolate was added to the mixture as a catalyst. The resulting mixture was coated on a copper wire and baked. The physical properties of the resulting coating are shown in Table 1.

Control 1

For comparison, the procedure of Example 1 was repeated except that 2,2-bis(4-cyanatophenyl)propane was not used. The results are shown in Table 1.

TABLE 1

|  | Ex. 1 | Control 1 |
| --- | --- | --- |
| wire size (mm) | 1.000 | 1.000 |
| coating thickness (mm) | 0.042 | 0.042 |
| winding property around the rod in 1 mm dia. | good | good |
| end pick-up (in 6 hrs.) | 260° C. OK | 240° C. OK |
| abrasion resistance (times) (two way, load = 600 grs.) | 290 | 250 |
| water resistance in steam at 120° C. at 2 atms. for 40 hrs. | good | changed slightly |
| dielectric breakdown | good | good |

EXAMPLE 2

Preliminary reaction of 200 grs. of polyamideimide employed in Example 1, 900 grs. of 2,2-bis(4-cyanatophenyl)propane and 100 grs. of bis(4-maleimidophenyl)methane was effected at 140° C. for 150 minutes. The preliminary reaction produce was dissolved in N,N-dimethylformamide. 0.3 Grs. of zinc octolate, 0.1 gr of catechol and 0.2 grs. of triethylenediamine was added to the mixture as a catalyst. The resulting mixture was coated on glass cloth and dried with heat to obtain B-stated prepreg.

Six prepreg sheets were stacked and sandwiched between two sheets of copper foil 35$\mu$ thickness. The laminate was laminate-molded at 40 Kg/cm$^2$ at 175° C. for 180 minutes. The physical properties of the copper-clad laminate are shown in Table 2.

TABLE 2

|  |  | Example 2 |
| --- | --- | --- |
| peel strength of copper foil 35 $\mu$ thickness (Kg/cm) | 250° C. | 1.75 |
|  | 170° C. | 1.70 |
|  | 250° C. | 1.35 |
| glass transition temperature (°C.) |  | 272 |
| flexural strength (200° C.), Kg/mm$^2$ |  | 41 |
| water resistance in steam at 120° C. at 2 atm. for 40 hrs. |  | no change |

In these Example, "winding property" means winding property when the coated wire is wound around a substrate in the same diameter.

What dielectric breakdown is good shows dielectric strength is more than 15 KV/mm thick.

What is claimed is:

1. In a curable resin composition comprising a mixture and/or a preliminary reaction product of:
    (A) at least one component selected from the group consisting of:

(i) a polyfunctional cyanate ester monomer having the formula:

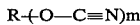

wherein m is an integer of 2 to 5 and R is an aromatic organic group, the cyanate groups being directly bonded to the aromatic nucleus of said aromatic organic group,
(ii) a prepolymer of (i), and
(iii) a coprepolymer of (i) and an amine; and
(B) another compound,
the improvement wherein said another compound is a polyamideimide obtainable by the reaction of trimellitic anhydride with aromatic diamine or aromatic diisocyanate, or the reaction of pyromellitic anhydride, aromatic diamine and aromatic dicarboxylic acid or aromatic aminocarboxylic acid.

2. The composition as defined in claim 1 wherein the cyanate ester is selected from the group consisting of 1,3-, 1,4-dicyanatobenzene; 1,3,5-tricyanatobenzene; 1,3-, 1,4-, 1,6-, 1,8- 2,6- or 2,7-dicyanatonaphthalene; 1,3,6-tri-cyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ester; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof.

3. The composition as defined in claim 1 wherein the ratio by weight of component (a) to component (b) is in the range of from 99:1 to 1:99.

4. In a curable resin composition comprising a mixture and/or a preliminary reaction product of:
(A) at least one component selected from the group consisting of:
(i) a polyfunctional cyanate ester monomer having the formula:

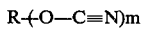

wherein m is an integer of 2 to 5 and R is an aromatic organic group, the cyanate groups being directly bonded to the aromatic nucleus of said aromatic organic group,
(ii) a prepolymer of (i), and
(iii) a coprepolymer of (i) and an amine;
(B) another compound; and
(C) at least one compound selected from the group consisting of:
(i) a polyfunctional maleimide,
(ii) a prepolymer of (C) (i), and
(iii) a coprepolymer of (C) (i) and an amine,
the improvement wherein said another compound is a polyamideimide obtainable by the reaction of trimellitic anhydride with aromatic diamine or aromatic diisocyanate, or the reaction of pyromellitic anhydride, aromatic diamine and aromatic dicarboxylic acid or aromatic aminocarboxylic acid.

5. The composition as defined in claim 4 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof.

6. The composition as defined in claim 4 wherein the ratio by weight of component (a) to component (b) is in the range of from 99:1 to 1:99.

7. A curable resin composition in accordance with claim 1 wherein said component (A) comprises a cyanate ester component comprising at least one component selected from the group consisting of:
(1) said polyfunctional aromatic cyanate ester monomer,
(2) prepolymers of (1), and
(3) coprepolymers of (1) and an amine, said amine being selected from the group consisting of meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-(4-aminophenyl)propane, 2,2bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

8. A curable resin composition in accordance with claim 4 wherein said component (A) comprises a cyanate ester component comprising at least one component selected from the group consisting of:
(1) said polyfunctional aromatic cyanate ester monomer,
(2) prepolymers of (1), and
(3) coprepolymers of (1) and an amine, said amine being selected from the group consisting of meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

9. A curable resin composition in accordance with claim 4 or claim 8, wherein said component (C) comprises:
at least one maleimide compound selected from the group consisting of
(a) a polyfunctional maleimide having the formula:

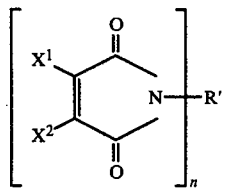

wherein R' is a divalent to pentavalent aromatic or alicyclic organic group, each of $X^1$ and $X^2$ represents a hydrogen atom, halogen atom or alkyl group, and n is an integer of 2 to 5,
(b) a prepolymer of (a), and
(c) a coprepolymer of (a) and an amine, said amine being selected from the group consisting of meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane, 1,1-bis(4-aminophenyl)-1-phenylethane, melamine having s-triazine ring, and a polyamine obtainable by reaction of aniline with formaldehyde, in which two or more benzene rings are bonded through a methylene bond.

* * * * *